United States Patent [19]

Yamashita et al.

[11] Patent Number: 5,135,202

[45] Date of Patent: Aug. 4, 1992

[54] APPARATUS FOR MELTING DOWN CHIPS

[75] Inventors: Satoshi Yamashita, Saitama; Akira Kinoshita, Nara, both of Japan

[73] Assignee: Hitachi Metals, Ltd., Tokyo, Japan

[21] Appl. No.: 684,918

[22] PCT Filed: Oct. 12, 1990

[86] PCT No.: PCT/JP90/01316

§ 371 Date: Jun. 28, 1991

§ 102(e) Date: Jun. 28, 1991

[87] PCT Pub. No.: WO91/05883

PCT Pub. Date: May 2, 1991

[30] Foreign Application Priority Data

Oct. 14, 1989 [JP] Japan .................. 1-267513

[51] Int. Cl.$^5$ ............................. C22B 9/16
[52] U.S. Cl. ..................... 266/233; 75/687; 266/901
[58] Field of Search ............ 266/233, 900, 901; 75/687

[56] References Cited

U.S. PATENT DOCUMENTS 4,052,199 10/1977 Mangalick .
4,169,584 10/1979 Mangalick .................. 266/214
4,286,985 9/1981 Van Linden et al. .
4,572,485 2/1986 Engelberg et al. .......... 266/227
4,598,899 7/1986 Cooper ....................... 266/212
4,907,784 3/1990 Kusaka et al. ............... 266/233

FOREIGN PATENT DOCUMENTS 119094 9/1984 European Pat. Off. .
168250 1/1986 European Pat. Off. .
2212603 7/1989 United Kingdom .

Primary Examiner—Melvyn J. Andrews
Attorney, Agent, or Firm—Sughrue, Mion, Zinn Macpeak & Seas

[57] ABSTRACT

An apparatus for melting down chips of, e.g., aluminum into a molten bath of a melting furnace for, e.g., aluminum. A charging vessel (10) is installed in the molten bath (2) of the melting furnace (1), and has an opening (11) kept above the surface (3) of the molten bath, an inlet port (12) through which molten metal (2) flows from the melting furnace (1) into the charging vessel (10), and an outlet port (13) located below the surface (3) of the molten bath. A discharge pipe (20) is attached to the discharge side of a pump (30) for conveying the molten metal (2), and has a sidewall provided with an intake port (24) connected with the outlet port (13) of the charging vessel (10) for returning the molten metal (2) into the melting furnace (1) through the discharge pipe (20). The apparatus can realize a drastically improved efficiency in melting chips (5), while preventing the oxidation of the chips (5).

11 Claims, 4 Drawing Sheets

APPARATUS FOR MELTING DOWN CHIPS

DESCRIPTION

1. Technical Field

This invention relates to an apparatus to melt down chips of aluminum, etc. into a molten bath of a melting furnace for aluminum, etc.

2. Background Art

The art to melt down aluminum chips by dipping them into a molten bath of a melting furnace has been developed to make the effective use of chips resulting from machining steps and so on of manufacturing process for aluminum products.

The art is, for example, disclosed in the Japanese Utility Model Laid-Open Nos. 136352/1985 and 136353/1985 in which, chips are charged into a substantially vertical feed pipe having a lower end dipped in a molten bath, and are forced into the molten bath by a screw conveyor mounted in the pipe.

The Japanese Utility Model Laid-Open Nos. 164592/1987 and 22997/1989 disclose the art of dipping chips into a molten bath by conveying a part of molten metal to a higher place through an electromagnetic trough, putting chips in it, and dropping them into the molten bath.

The prior art devices as hereinabove described have, however, the drawback that the apparatus becomes too large since it includes a screw conveyor or an electromagnetic trough. The art which employs the electromagnetic trough furthermore has the drawback that the apparatus becomes expensive.

The art which employs the screw conveyor has also been found to achieve only a low chip melting efficiency, since chips are very likely to float, even if that may once be forced down into the molten bath. The chips become melted, as their temperature is raised by the heat of the molten metal which they contact. The molten metal contacting the chips lowers its temperature, as its heat is taken away by the chips. As hardly any flow occurs to the molten metal contacting the chips, its temperature is eventually lowered to a level in the vicinity of the melting point of the chips. This brings about a reduction in chip melting efficiency. Therefore a large amount of chips are not melted, but float on the surface of the molten bath and undergo oxidation being exposed to the air.

According to the art which employs the electromagnetic trough, there is always a fresh supply of molten metal that is contacted with chips. But this method causes a great disturbance to the surface configuration of the molten bath as a whole, and thereby gives rise to the problems as pointed out below. Firstly, a waste of power is unavoidable to raise the potential energy of a part of molten metal. Secondly, that part of molten metal which is conveyed by the trough has an extremely large surface area for its volume. It has so large an area of contact with air as to be easily oxidized and necessarily undergo an unnegligibly great reduction in temperature when it is conveyed. Therefore, this method can achieve only a low chip melting efficiency, as is the case with the method which employs the screw conveyor.

It is, therefore, an object of this invention to achieve an improved chip melting efficiency by ensuring that a fresh supply of molten metal is always furnished for contacting chips without causing any substantial disturbance to the surface configuration of the molten bath as a whole.

DISCLOSURE OF THE INVENTION

This invention has been made to attain its object as hereinabove set forth, and consists in a chip melting apparatus which comprises: a charging vessel adapted for immersion in a bath of molten metal in a melting furnace, having an opening kept above the surface of the bath, an inlet port through which molten metal is allowed to flow from the bath into the charging vessel, and an outlet port located below the surface of the bath; a pump for conveying the molten metal; and a discharge pipe connected to the discharge side of the pump and having an intake port on a sidewall connected to the outlet port of the charging vessel for returning molten metal into the bath through the discharge pipe.

The inlet port of the charging vessel can be provided through its sidewall, and its outlet port through a bottom wall. The charging vessel may comprises a cylinder, or like body of rotation having a substantially vertical axis, and its outlet port may be provided at or near the intersection between its axis and bottom wall. The inlet port of the charging vessel may be opened in an eccentric direction to the vertical line passing through its outlet port. The discharge pipe may be disposed substantially horizontally below the charging vessel, and provided at the top of its wall with its intake port contacted with the outlet port of the charging vessel.

That portion of the discharge pipe which is provided with the intake port can be reduced in diameter by means of, e.g., an orifice, or venturi, or can be sharply increased in diameter. The discharge pipe may comprise an outer pipe having a sidewall provided with the intake port and one end provided with a plug, and an inner pipe having one end connected to the discharge side of the pump, extending through the plug, and having another end positioned in the vicinity of the intake port. The discharge pipe may at least so extend that its discharge end may be located in the vicinity of the outer peripheral portion of the charging vessel.

Partition means can be provided in the melting furnace to define a heating chamber so that the molten metal be supplied from the chamber to the suction port of the pump or the inlet port of the charging vessel, or both.

Description will now be made of the operation of this invention. As the molten metal in the bath of the melting furnace flows into the charging vessel through its inlet port, the molten metal pressure in the vessel in the neighborhood of its outlet port is nearly equal to that of the bath. When the pump is in operation, the molten metal pressure in the discharge pipe in the neighborhood of its intake port is lower than that of the bath by a measure corresponding approximately to the velocity head, as is obvious from the Bernoulli's theorem, and is, therefore, lower than the molten metal pressure in the charging vessel in the neighborhood of its outlet port. As a result, the molten metal leaving the pump draws molten metal from the charging vessel, or in other words, the former forms a driving stream, while the latter forms a driven one, and they combine and return into the bath through the discharge pipe. Therefore, if chips are charged into the charging vessel through its opening, they are conveyed by the molten metal in the charging vessel, and further by the molten metal passing through the pump until they reach the molten bath in the melting furnace.

The use of the melting apparatus according to this invention does not bring about any substantial change in the surface configuration of the molten metal as a whole. Therefore, no partial cooling occurs to the molten metal. Moreover, both the charging vessel and the pump always receive a fresh supply of molten metal. Therefore, the chips which have been charged into the charging vessel through its opening are fully melted before they reach the molten bath in the melting furnace.

The inlet port of the charging vessel needs to be so formed in its side or bottom wall that at least a part of the inlet port may be located below the surface of the molten bath, insofar as it is provided for admitting molten metal from the bath to the charging vessel. The outlet port of the charging vessel is preferably located in its entirety below the surface of the molten bath to shut out any intake of air therethrough. Therefore, it is preferable to form the inlet port of the charging vessel in its sidewall, and its outlet port in its bottom wall. If they are so formed, the molten metal flowing out through the outlet port is rotated by the Coriolis force to form a whirlpool which promotes the melting of chips into the molten metal. The whirlpool enables a prolonged time of contact between the chips and the molten metal and thereby a greatly improved heat exchange therebetween, while the chips are not oxidized, as the whirlpool does not draw any air.

Although the charging vessel may be constructed as, e.g., a square cylindrical body having its outlet port formed in the center, or any other portion, of its bottom wall, it is easier to construct the charging vessel as a body of rotation having a substantially vertical axis and provide its outlet port approximately on the intersection between its axis and bottom wall. The inlet port of the charging vessel is preferably positioned in an eccentric relation to the vertical line passing through its outlet port, so that the molten metal in the charging vessel may be forced to form a whirlpool which promotes the melting of chips into the molten metal to a further extent.

If the outlet port of the charging vessel is formed in its bottom wall, it is advisable from the standpoint of ease of manufacture to dispose the discharge pipe substantially horizontally below the charging vessel and form the intake port of the discharge pipe in the top of its wall in alignment with the outlet port of the charging vessel. Other ways are, however, available for establishing communication between the outlet port of the charging vessel and the intake port of the discharge pipe. For example, it is possible to use a pipe for connecting them, or it is possible to construct the charging vessel in such a way that its bottom or side wall may form a part of the wall of the disharge pipe.

Although the Bernoulli's theorem may teach that the molten metal in the discharge pipe in the neighborhood of its intake port is lower in pressure than the molten metal in the bath, a loss of pressure does actually occur to the molten metal in the discharge pipe from its intake port to its discharge end. Therefore, if the discharge pipe has the same diameter throughout its length, it is difficult to keep a satisfactorily low molten metal pressure in the discharge pipe in the neighborhood of its intake port, as compared with the pressure of the molten metal in the bath, and it is, therefore, difficult to achieve a strong suction of therefore, difficult to achieve a strong suction of molten metal from the charging vessel into the discharge pipe.

It is, therefore, preferable to reduce the diameter of the discharge pipe, or enlarge it sharply, in its portion having the intake port in order to increase the velocity of the molten metal in the discharge pipe in the neighborhood of its inlet port to lower the pressure of the molten metal in that region, and in order not to bring about any increase in pressure loss from the intake port of the discharge pipe to its discharge end. If the discharge pipe comprises an outer pipe having a sidewall provided with the intake port and one end provided with a plug, and an inner pipe having one end connected to the discharge side of the pump, extending through the plug, and having another end located in the vicinity of the intake port, it is substantially identical in construction to a pipe having a sharply enlarged diameter, since there is substantially no molten metal flow in an annular region defined between the inner and outer pipes. Therefore, it can accomplish a strong suction of molten metal from the charging vessel.

If the discharge pipe so extends that its discharge end may be located at least in the vicinity of the outer peripheral portion of the charging vessel, it permits a prolonged time of contact between chips and fresh molten metal in the discharge pipe and thereby enables a greatly improved heat exchange therebetween.

It is likely, depending on the arrangement of the melting furnace, or the melting apparatus, that the molten metal leaving the discharge pipe may circulate along a short circuit to the suction port of the pump and the inlet port of the charging vessel without passing through the heating zone of the melting furnace. If such circulation continues, the circulating molten metal has too low a temperature to melt chips. Any such reduction in melting efficiency can be avoided, if partition means is provided in the melting furnace for ensuring that the molten metal leaving the discharge pipe reach at least one of the suction port of the pump and the inlet port of the charging vessel, or preferably both of them, after passing through the heating chamber of the melting furnace.

BEST MODE FOR CARRYING OUT THE INVENTION

Figure 1:
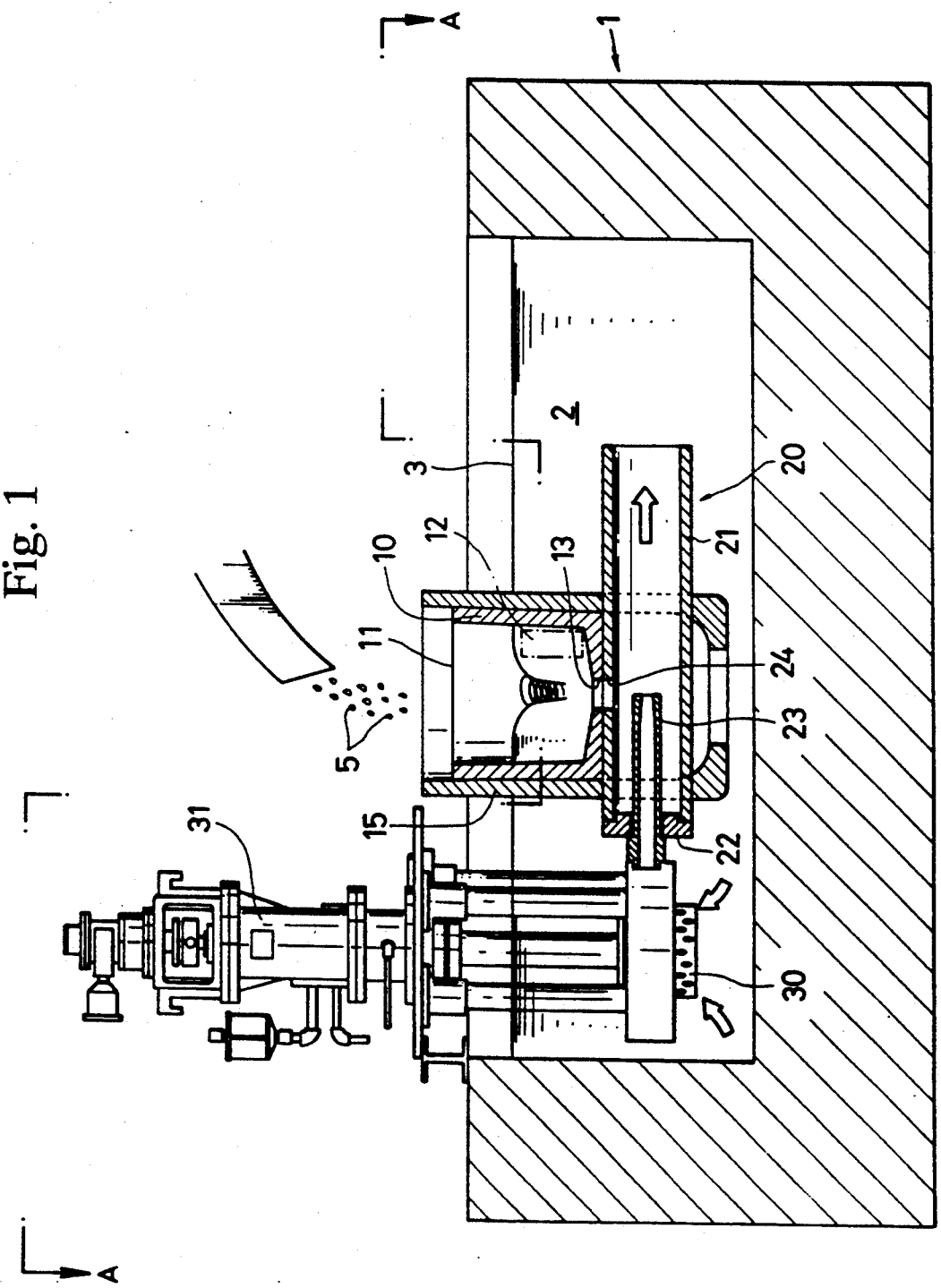
FIG. 1 is a front elevational view, partly in section, of an apparatus embodying this invention.
Figure 2:
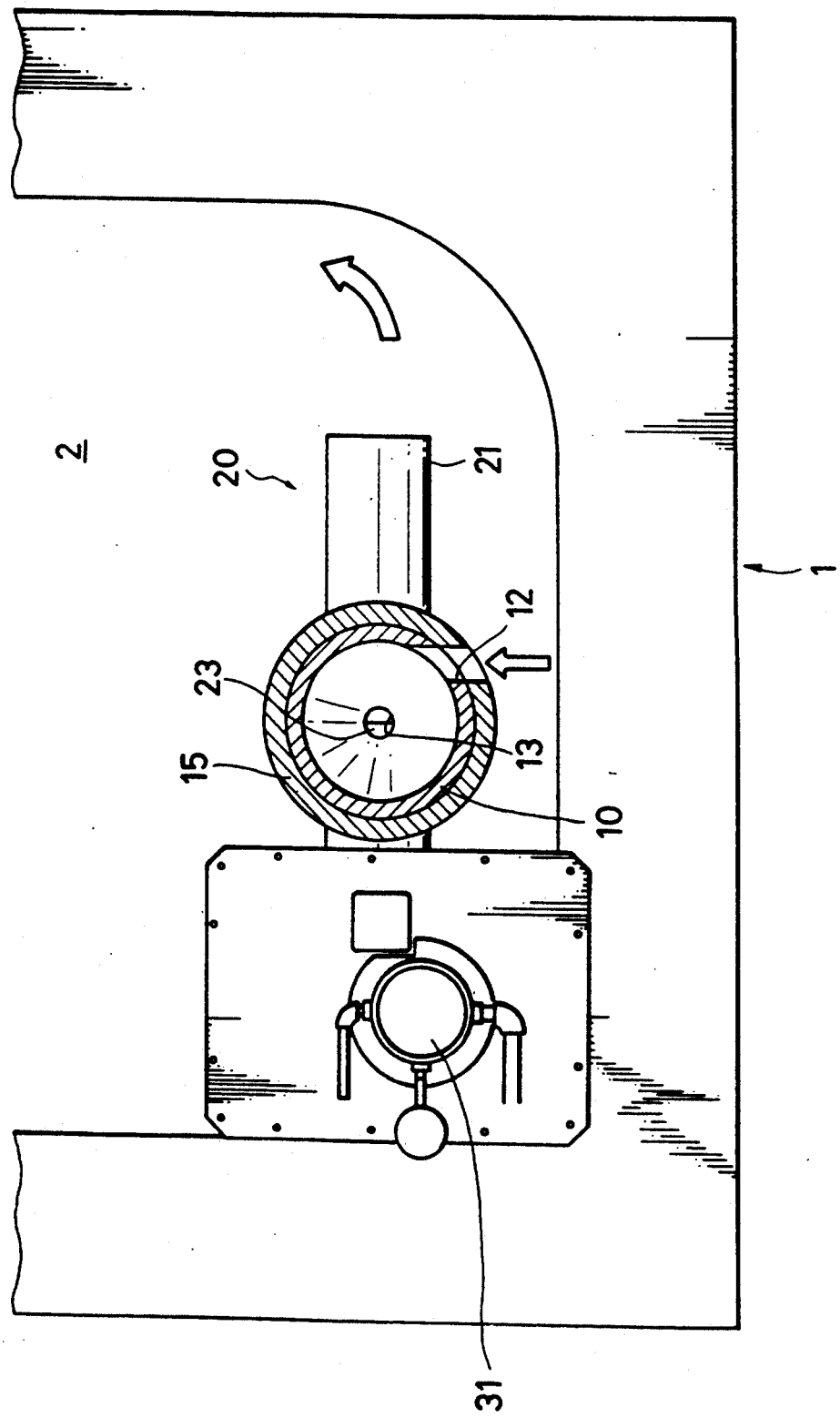
FIG. 2 is a sectional view taken along the line A—A of FIG. 1.

An embodiment of this invention will be described with reference to FIGS. 1 and 2. A charging vessel 10 having an opening 11, an inlet port 12 and an outlet port 13 is immersed in a bath of molten metal 2 in an aluminum melting furnace 1.

The charging vessel 10 comprises a cylindrical body having a bottom wall, formed from a refractory material, and having a substantially vertical axis. Its top opening 11 is provided for admitting a charge of chips 5 and is kept above the surface 3 of the molten bath 2. The charging vessel 10 has a sidewall with an inside diameter slightly decreasing toward its bottom. The bottom wall of the charging vessel 10 has an upper surface which is lightly inclined downwardly toward its center, and the outlet port 13 is located in the center of the bottom wall.

The inlet port 12 is provided for admitting molten metal 2 from the melting furnace 1 into the charging vessel 10, and at least a part thereof need be located below the surface 3 of the molten bath. According to the embodiment under description, the inlet port 12 is formed in the sidewall of the charging vessel 10 and is so positioned as to disappear in its entirety below the surface 3 of the molten bath when the surface 3 has risen to its highest level, while only a part thereof disappears below the surface 3 when it has dropped to its lowest level. Although the inlet port 12 can be formed as a slit extending downwardly from the edge of the opening 11, it is better from the standpoint of strength of the charging vessel to form the inlet port 12 in the sidewall of the charging vessel 10 as shown. The inlet port 12 is not axially directed toward the axis of the cylindrical charging vessel 10, but is formed in an eccentric relation to the axis, or in a tangential relation to the inner wall surface of the charging vessel 10, as shown in FIG. 2, so that the molten metal 2 entering the charging vessel 10 may be forced to produce a whirlpool.

A discharge pipe 20 is substantially horizontally disposed below the charging vessel 10 and is provided through the top of its sidewall with an intake port 24 contacting to connect with the outlet port 13 of the charging vessel 10. A supporting vessel 15 formed from a refractory material surrounds the charging vessel 10 and the discharging pipe 20 and supports them. The supporting vessel has an opening aligned with the inlet port 12 of the charging vessel 10 to allow the molten metal 2 to flow from the bath into the charging vessel 10.

According to the embodiment under description, the discharge pipe 20 comprises a ceramic outer pipe 21, a plug 22 attached to one end (the left end in FIG. 1) of the outer pipe 20, and an inner pipe 23 penetrating the plug 22. The intake port 24 aligned with the outlet port 13 of the charging vessel 10 is formed at the top of the sidewall of the outer pipe 21. One end (the left end in FIG. 1) of the inner pipe 23 is connected to the discharge side of a ceramic pump 30, and the other (right) end thereof is located immediately below the intake port 24 of the outer pipe 21 and has an reduced inside diameter to form a nozzle in order to produce a narrow stream having a higher velocity and thereby a lower pressure. A ceramic air motor 31 is mounted above the pump 30 for driving it.

With the apparatus constituted as hereinabove described, molten metal 2 flows from the melting furnace 1 into the charging vessel 10 through its inlet port 12. If the pump 30 is operated by the air motor 31, molten metal 2 is drawn from the melting furnace into the pump 30, and is discharged through the other (right in FIG. 1) end of the inner pipe 23 of the discharge pipe 20 connected to the discharge side of the pump 30 into the outer pipe 21. The molten metal 2 lowers its flow velocity in the outer pipe 21, and the molten metal at the other (right) end of the inner pipe 23 has a drastically reduced pressure. As the intake port 24 connected with the outlet port 13 of the charging vessel 10 is located in that region, the molten metal 2 passing through the pump 30 forms a driving stream, while the molten metal 2 passing through the charging vessel 10 forms a driven stream and is strongly drawn into the discharge pipe 20, where they combine and return into the melting furnace 1 through the discharge pipe 20.

If chips 5 are charged into the charging vessel 10 through its opening 11, they are conveyed first by the molten metal 2 in th charging vessel 10 and then by the molten metal 2 passing through the pump 30 until they reach the melting furnace 1. The chips 5 are fully melted before entering the melting furnace 1, since they are heated first by the molten metal 2 in the charging vessel 10 which is constantly fed with a fresh supply of molten metal, and then by the molten metal 2 leaving the pump 30 which is constantly fed with a fresh supply of molten metal, too.

As the inlet port 12 is directed in an eccentric relation to the axis of the charging vessel 10, the molten metal 2 in the charging vessel 10 is urged to form a whirlpool to promote the melting of the chips 5 into the molten metal 2.

If there is any possibility of chips 5 floating on the surface of the molten bath without melting, it is possible to overcome any such possibility by increasing the length of the discharge pipe 20 from its intake port 24 to its discharge end. The discharge pipe 20 preferably so extends that its discharge end may be located at least in the vicinity of the outer periphery of the charging vessel 10, as shown.

Figure 3:
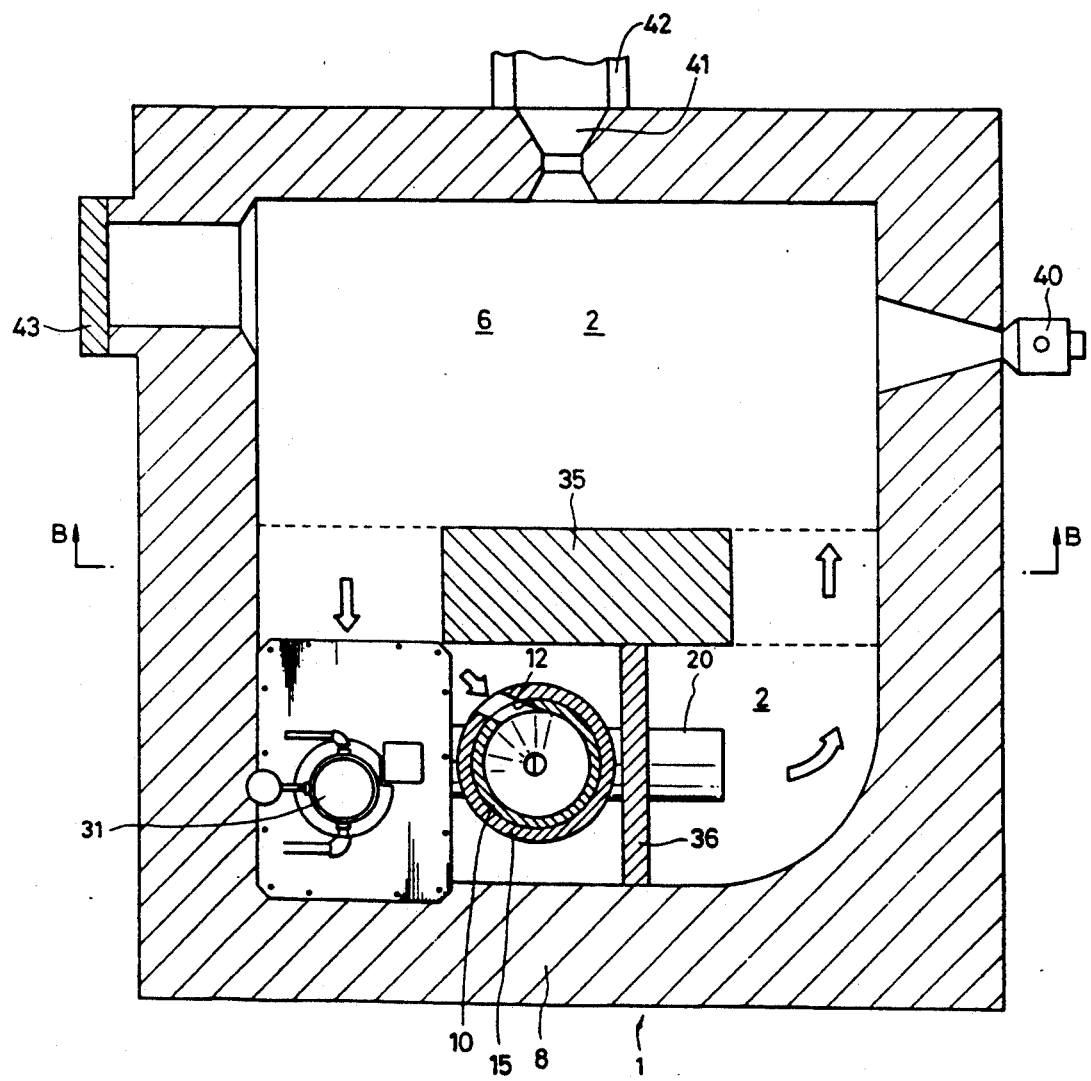
FIG. 3 is a top plan view, partly in section, of an apparatus according to another embodiment of this invention.
Figure 4:
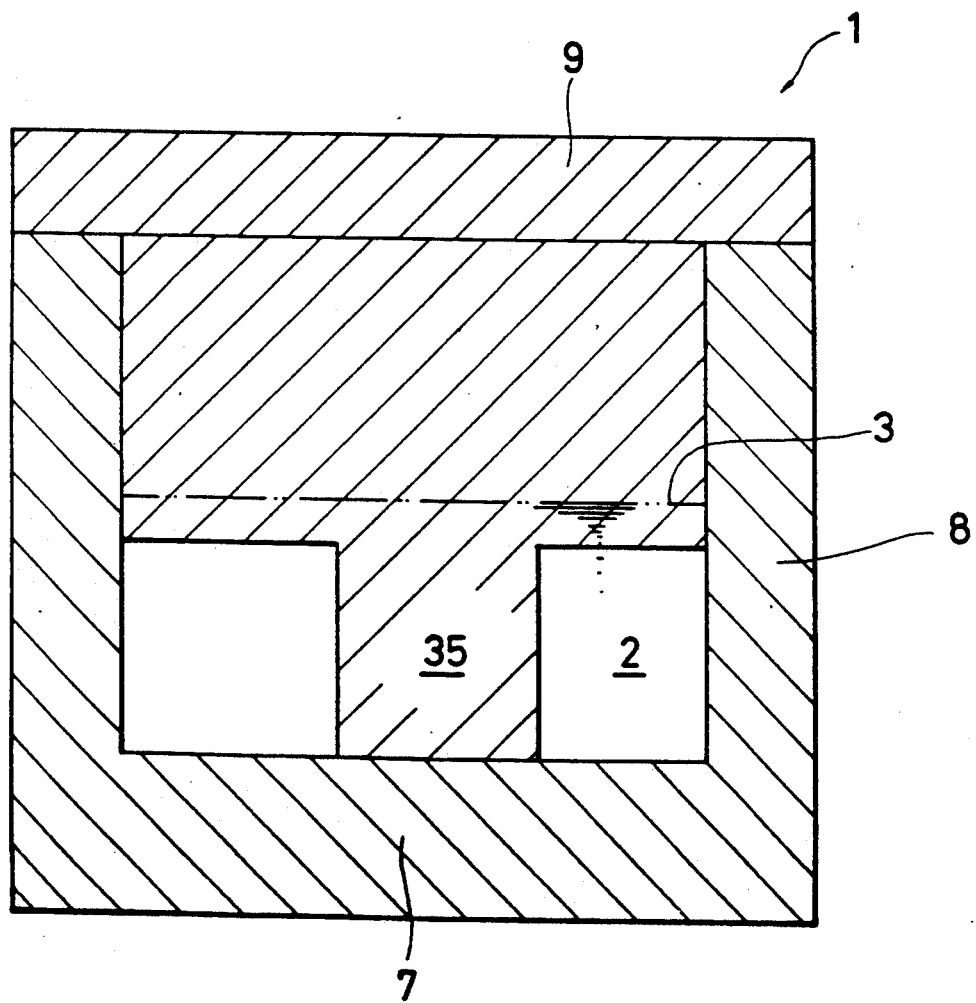
FIG. 4 is a sectional view taken along the line B—B of FIG. 3.

Description will now be made of another embodiment of this invention with reference to FIGS. 3 and 4. This embodiment differs from the embodiment which has hereinabove been described, in that it includes partition means comprising a middle furnace wall 35 and a partition wall 36, and that the charging vessel 10 has a differently positioned inlet port 12, as shown in FIG. 3. The middle furnace wall 35 is so positioned as to separate the melting apparatus of this invention from the heating chamber 5 of the melting furnace 1. It is a generally T-shaped wall having a central portion which extends from the hearth 7 of the furnace to its roof 9 and cooperates with the sidewall 8 of the furnace to support their roof 9, and a pair of horizontally extending portions each having a lower surface kept below the surface 3 of the molten bath. The partition wall 36 has a pair of vertical edges contacting the furnace sidewall 8 and the middle furnace wall 35, respectively, a bottom contacting the hearth, and a top kept above the surface of the molten bath. The discharge pipe 20 projects beyond the outer peripheral portions of the charging vessel 10 and the supporting vessel 15, and extends through the partition wall 36. The molten metal 2 is heated by a heating burner 40 provided on the side of the heating chamber 6 of the melting furnace 1. The burner may be fired with gas or oil, or a electric heater may be used. The source of heat can be installed in either the sidewall or roof of the furnace, or an immersed heater tube (not shown) can alternatively be used. The molten metal 2 is poured out through a tap hole 41 and a spout 42. A door 43 is provided for opening and closing a hole through which a slag is removed.

In the apparatus under description, the molten metal 2 leaving the discharge pipe 20 does not flow along a short circuit to the suction port of the pump 30 nor the inlet port 12 of the charging vessel 10, but is compelled to flow through the heating chamber 6 before reaching the pump and the inlet port. Therefore, this melting apparatus is always replenished with hot molten metal from the heating chamber 6, and enables an improved chip melting efficiency.

The results which are similar to what can be achieved by this invention can be attained by an apparatus which includes a pipe connected to the outlet port of the charging vessel, and a pump adapted to discharge molten metal into that pipe to draw chips along an annular path, or an apparatus which includes a discharge vessel and having a plurality of holes formed through its portion extending into the charging vessel to draw chips along a plurality of paths.

INDUSTRIAL APPLICABILITY:

In the first place, chips are heated by both the molten metal in the charging vessel and the molten metal passing through the pump, both of which are constantly refreshed and maintain a high temperature without undergoing any lowering in temperature by contacting chips. The apparatus of this invention can, therefore, realize a drastically improved chip melting efficiency.

In the second place, no oxidation of chips occurs, as no flotation of chips occurs, and as no disturbance occurs to the surface configuration of the molten bath as a whole.

In the third place, the pump is used only for moving the molten metal, and is not required to supply any energy as for conveying a part of a molten metal to a higher place. In the fourth place, the pump produces a driving stream of molten metal, and chips are taken into a driven stream without passing through the pump. Therefore, the chips do not cause any damage to the pump impeller.

We claim:

1. An apparatus for melting down chips for use with a melting furnace having a bath of molten metal, said apparatus comprising:

a charging vessel adapted for immersion in the bath of molten metal of the melting furnace, said charging vessel having an opening kept above a surface of the bath, an inlet port through which the molten metal flows from the bath into said charging vessel, and an outlet port located below the surface of the bath;

a pump for conveying the molten metal, said pump having a suction side and a discharge side; and a discharge pipe attached to the discharge side of said pump, said discharge pipe comprising a sidewall and having an intake port passing through said sidewall and connected with said outlet port of said charging vessel for returning the molten metal to the bath through said pipe.

2. An apparatus for melting down chips in accordance with claim 1, wherein said charging vessel comprises a sidewall and a bottom wall, said inlet port being provided on said sidewall of said charging vessel, and said outlet port is provided on said bottom wall of the charging vessel.

3. An apparatus for melting down chips in accordance with claim 2, wherein said inlet port of the charging vessel opens in an eccentric direction with respect to a vertical line passing through said outlet port of the charging vessel.

4. An apparatus for melting down chips in accordance with claim 2, wherein said discharge pipe is disposed substantially horizontally below said charging vessel, and said intake port of the discharge pipe is provided at a top portion of the sidewall of the discharge pipe to contact with said outlet port of the charging vessel.

5. An apparatus for melting down chips in accordance with claim 3, wherein said discharge pipe is disposed substantially horizontally below said vessel, and said intake port of the discharge pipe is provided at a top portion of the sidewall to contact with said outlet port of the charging vessel.

6. An apparatus for melting down chips in accordance with claim 1, 2 or 5, wherein said discharge pipe has a diameter reduced in the vicinity of said intake port thereof.

7. An apparatus for melting down chips in accordance with claim 1, 2 or 5, wherein said discharge pipe has a diameter enlarged sharply in the vicinity of said intake port thereof.

8. An apparatus for melting down chips in accordance with claim 1, 2 or 5, wherein said discharge pipe comprises an outer pipe portion having said intake port on a sidewall thereof and a plug at one end, and an inner pipe portion connected to said discharge side of the pump, penetrating through said plug of the outer pipe portion, and extending to the vicinity of said intake port of the outer pipe portion.

9. An apparatus for melting down chips in accordance with claim 1, wherein said charging vessel comprises a cylindrical body having a substantially vertical axis and a bottom wall, and said outlet port of the charging vessel is located at or near the intersection between said axis and the bottom wall of the charging vessel.

10. An apparatus for melting down chips in accordance with claim 1, wherein said charging vessel has an outer periphery and said discharge pipe includes a discharge end, said discharge end of said discharge pipe extends at least to the vicinity of the outer periphery of said charging vessel.

11. An apparatus for melting down chips in accordance with claim 1, wherein said apparatus further includes partition means to define a heating chamber of the melting furnace through which the molten metal is supplied to said suction side of said pump or said inlet port of the charging vessel or to the both.

* * * * *